B. HAUSHEER.
SOLDER PLACING MACHINE.
APPLICATION FILED JAN. 17, 1913.

1,104,261.

Patented July 21, 1914.
5 SHEETS—SHEET 1.

B. HAUSHEER.
SOLDER PLACING MACHINE.
APPLICATION FILED JAN. 17, 1913.

1,104,261.

Patented July 21, 1914.
5 SHEETS—SHEET 3.

Witnesses
C. A. Jarvis
George H. Measures

Inventor
Bernard Hausheer
by Walter D. Edmonds
attorney

B. HAUSHEER.
SOLDER PLACING MACHINE.
APPLICATION FILED JAN. 17, 1913.

1,104,261.

Patented July 21, 1914.
5 SHEETS—SHEET 4.

Witnesses
C. A. Jarvis
George A. Measures

Inventor
Bernard Hausheer
by Walter F. Edmonds
attorney

UNITED STATES PATENT OFFICE.

BERNARD HAUSHEER, OF NORWICH, NEW YORK, ASSIGNOR TO BORDEN'S CONDENSED MILK COMPANY, OF NEW YORK, N. Y., A CORPORATION OF NEW JERSEY.

SOLDER-PLACING MACHINE.

1,104,261.      Specification of Letters Patent.      Patented July 21, 1914.

Application filed January 17, 1913. Serial No. 742,579.

*To all whom it may concern:*

Be it known that I, BERNARD HAUSHEER, a citizen of the United States, and a resident of Norwich, in the county of Chenango and State of New York, have invented certain new and useful Improvements in Solder-Placing Machines, of which the following is a specification.

My present invention relates more particularly to that class of cap-soldering machines employed to solder caps to cans previously filled with merchandise as for example condensed milk. These caps are circular to fit the corresponding circularly flanged openings of said cans, preservation of the latter's contents being dependent on proper application of solder to, and its retention when cold, in all parts of the resulting joint. The class of said machines to which my present invention particularly relates is that in which pluralities, or groups, of such cans are simultaneously moved, to and from, and alined and centered relatively to, pluralities of alike devices operating respectively to automatically place caps upon said cans, apply solder and flux to their said joints, and then hot-iron them until hermetically seamed, a type of such machines being disclosed in U. S. Letters Patent No. 1,030,300, granted me June 25, 1912. My researches have now demonstrated that a superiorly effective and economical method of soldering said joints comprises preliminary application of the solder thereto while cold, in shape and quantity proportioned to fit requirements of the resulting seam, as, for example, in the form of a preliminarily produced ring of solder. To cover this method I filed on July 27, 1912, my pending application for patent designated as Serial No. 711,775, and to cover means for producing such rings I filed on May 14, 1912, my pending application designated as Serial No. 697,139.

The objects of my present invention comprise provision of means whereby such rings may be automatically, simultaneously, and accurately placed upon such joints of such pluralities, or groups, of cans, thereby not only economizing in solder, since the rings are proportioned to supply approximately no more than required for an air-tight seam, but also diminishing the time and skill previously required for proper soldering.

I attain the foregoing, and other, objects of my invention by the novel mechanisms, and combinations of elements, hereinafter described and claimed, the same being illustrated in the accompanying drawings, in which—

Fig. 8 is a vertical central cross-sectional view, on still more enlarged scale, of details comprising a can, a cap, a solder ring and other parts, including said slide-plate.

Figure 1:
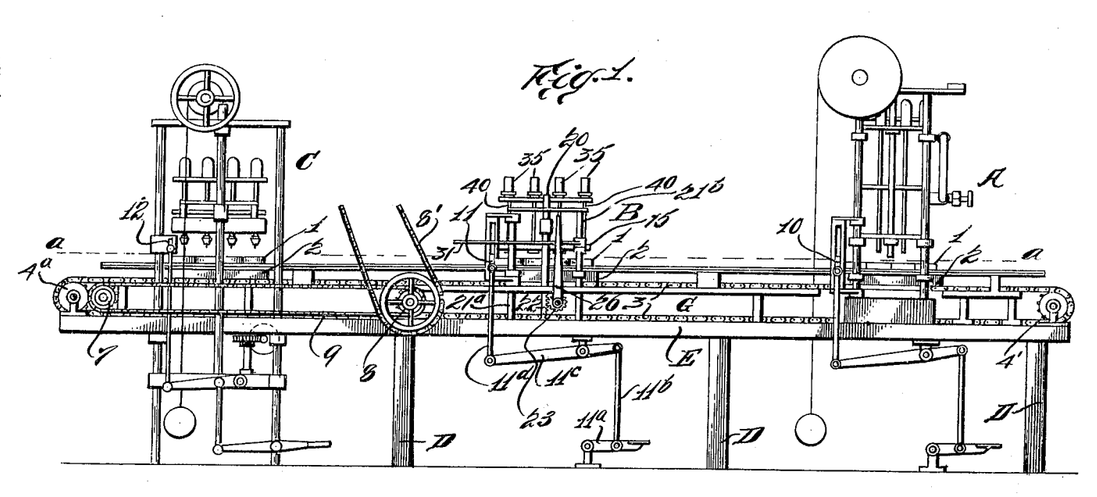
Figure 1 is a more or less diagrammatic side elevation of an organized machine, comprising not only my present solder-placing devices, but also, located in advance thereof, cap-placing devices, and, in rear thereof, solder-ironing devices, the latter being of the type disclosed in my pending application for patent filed June 7, 1912, designated as Serial No. 702,154.
Figure 2:
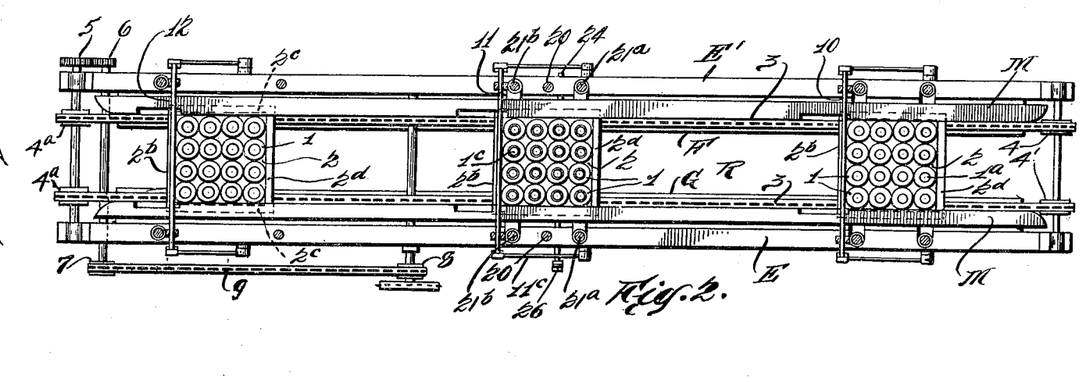
Fig. 2 is a plan view, partly in section, of the machine of Fig. 1, said section being taken on the line *a—a* of the latter.

In Figs. 1 and 2 I have, for the better understanding of my present improvements and their preferred application, shown diagrammatically one type of the aforesaid machines by which like cans are automatically and simultaneously, in groups, first forwarded to a group of like cap-placing devices A; next centered and held relatively thereto during operation thereof as per my said Letters Patent No. 1,030,300; next further forwarded, and positioned, relatively to a group of like solder-placing devices B embodying my present improvements; and thence further forwarded, etc., to a group of like solder-ironing devices C of the type disclosed in my said application, Serial No. 702,154. Other devices might be employed for placing the caps and ironing the solder, the two which operations are independent of my present solder-placing improvements, except in so far as the latter require, as a prerequisite, proper placing of the caps over the openings of the cans, and the solder when placed as per my present improvements does not seal until after it has been heated and ironed in place. But the aforesaid sequence of operations required to properly seal simultaneously the aforesaid pluralities or groups of cans cannot be performed in the one machine with as few manual operations except by aid and co-action of my can-forwarding and can-centering devices which are therefore shown and described to the end that my present invention may be better understood in its preferred method of application.

Figures 9, 11, 13:
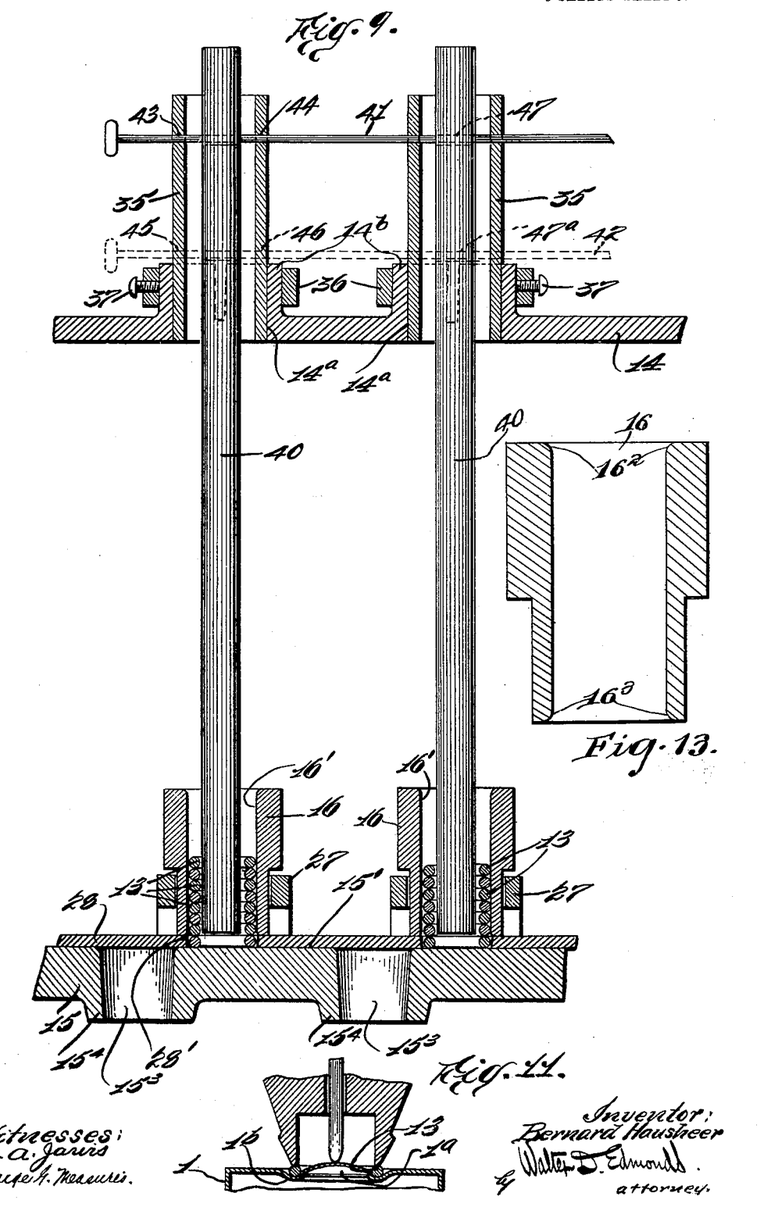
Fig. 11 is a central, vertical, sectional view of a can top, a cap, a solder ring, and a soldering-iron device, showing the relation of the latter to the ring during soldering.
Fig. 13 is a central vertical section of one of my cylindrical, or tubular, magazines on a scale enlarged so as to show more clearly, than in Fig. 9, the edge bevels.

The cans, 1, are, as shown, cylindrical and of like dimensions, the top of each containing a therewith concentric round opening, $1^a$, the edge of which is provided with a circumferential flange, $1^b$, upon which is placed a spherical cap, $1^c$, (see Figs. 2, 8, 11). The machine as shown in its entirety in Figs. 1 and 2 is supported by a suitable frame comprising legs D, D, horizontally longitudinally extending supporting members E, E', and, mounted on latter, auxiliary supporting elements F, G.

Figure 3:
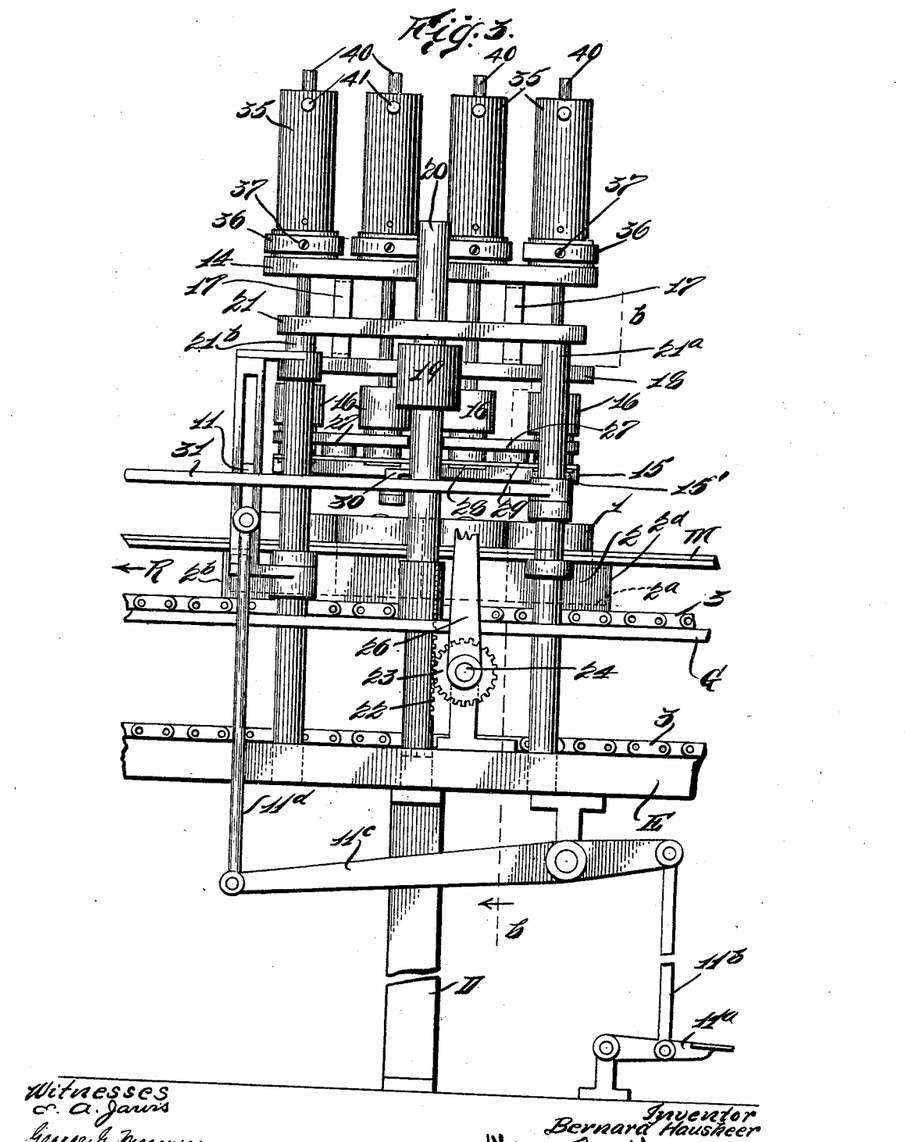
Fig. 3 is a side elevation, on enlarged scale, of my solder-placing devices proper.
Figure 4:
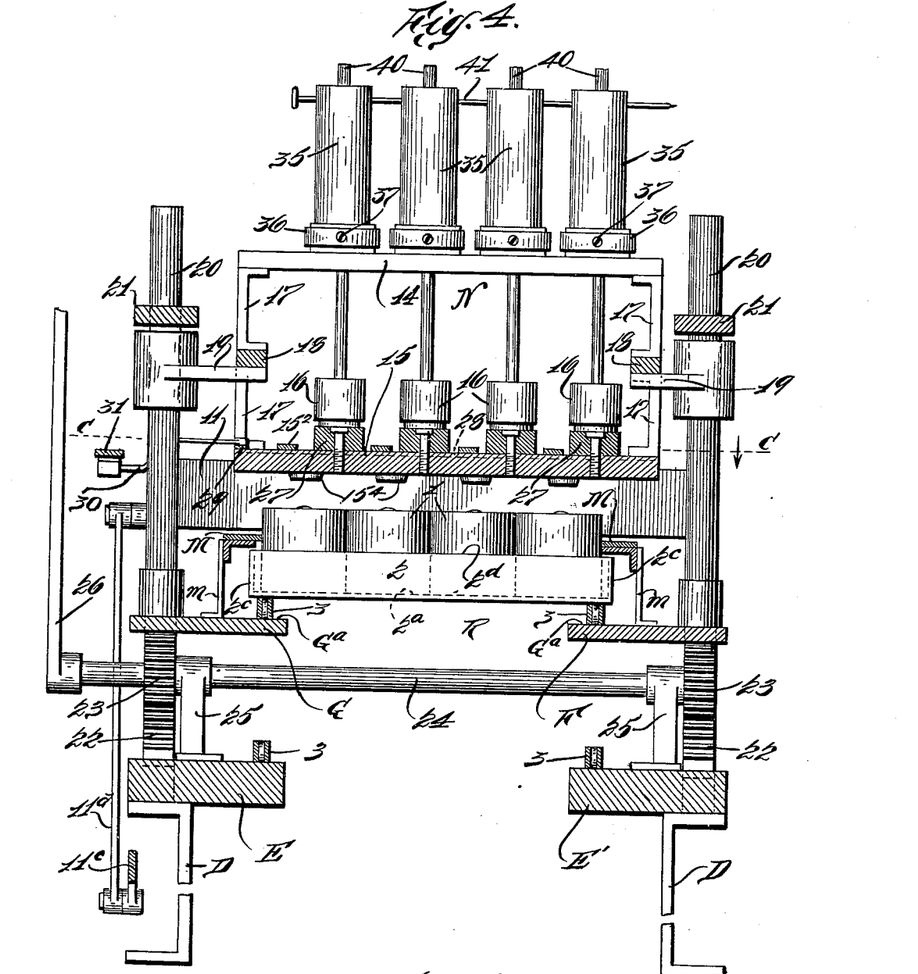
Fig. 4 is a vertical cross-section of Fig. 3 taken on the dotted line *b—b* of the latter and seen in the direction of the arrow intersecting said line.

In the machine shown in Figs. 1 and 2, as in the machine described in my said Letters Patent No. 1,030,300, the cans are forwarded through the machine; also, at intervals, stopped temporarily under the respective groups of operating devices A, B, C, and accurately centered and held relatively thereto, by action, and co-action, of the following devices, viz:—My machine has, extending longitudinally therethrough, a runway, R, for the cans, bounded laterally, on each side, by parallel, lateral, alining members, M, M, and below by the endless conveyer hereinafter described, coöperating with which and with other elements as hereinafter described are movable trays or carriers, 2, comprising a bottom, $2^a$, (shown by dotted lines in Figs. 3 and 4), a front member $2^b$, (Fig. 2), side members, $2^c$, and a transverse tail-board, or rear member, $2^d$, (Figs. 2, 3 and 4), for a specific purpose hereinafter described; said carrier, as a whole, being dimensioned and adapted to carry loosely thereon a group of similarly shaped, or like, cylindrical cans, i. e. the capacity of said carrier is somewhat greater than the number of cans contained, as indicated in part by dotted lines, (Figs. 3 and 4), thus admitting some movement of the cans on the bottom of said carrier relatively thereto and to each other. The said endless conveyer consists, in this instance, of the sprocket-chains, 3, movably supported on sprocket-wheels 4, 4', $4^a$, $4^a$, and underneath ways, as, for example, $G^a$, (Figs. 3 and 4). Means are provided to impart to said conveyer continuous motion in parallelism with said runway, i. e. the chains 3 are driven by the sprocket-wheels $4^a$, located near the delivery end of the machine. Sprocket-wheels $4^a$, $4^a$, are rotated by gear 5 (Fig. 2), intermeshed with pinion 6, rotated by sprocket-wheel 7, rotated by another sprocket-wheel 8, through sprocket-chain 9. Wheel 8 is operatively connected, in any convenient manner, as per sprocket-chain 8' for example, with the main power shaft of the machine not shown. The cans, 1, constitute, in this instance, a group of even number, i. e. sixteen. It will be understood that they have, prior to insertion into the machine, been filled with merchandise, as for example condensed milk, requiring for its preservation hermetic sealing. The aforesaid trays or can-carriers 2 loosely ride on the chains 3 constituting the endless conveyer, i. e. are supported and held thereon by gravity and friction only. Laterally bounding the can-runway are said parallel, alining, members, or rails, M, (Figs. 2 and 4), mounted upon angle-irons m supported on elements G, G, etc., of the frame of the machine. Said lateral members are supported, and disposed, sufficiently above the conveyer chains 3 to clear the trays, or carriers, 2, and sufficiently proximate to the center of said runway to contact with some of the group of cans loosely carried on the floor of said carrier. Said lateral, alining, members are spaced-apart a distance equal to the sum of the diameters of an aliquot number of said even-numbered group of like cans (Figs. 2 and 4), thus permitting some of the cans to be advanced and held abreast of each other in the runway. The centers of the finally operating parts of the devices constituting each of said groups A, B, C, are mutually spaced-apart a distance equal to the diameter of each of said cans, and the interspace between inner faces of said lateral members and vertical axes of said centers theerto most proximate is equal to one-half of said diameter. It follows that the said lateral alining members will, as the cans are carried through the runway, contact with some cans and, co-acting with said conveyer, guide the group toward positions in which their centers will register with said centers of said operating devices. Transverse said runway of the machine in the path of said cans are a plurality of movable, normally closed, stops, 10, 11, 12, sequentially disposed, as shown, to, in turn, contact with some of said cans and, coacting with said conveyer and said lateral members, crowd said group into positions, in equal ranks, in which centers of said cans will register, in turn, with said centers of said operating devices. The said stops are kept normally closed by gravity in, and transverse, the upper part of the path of the cans in said runway, being however, like the said lateral alining members M, located sufficiently above the conveyer chains 3 to clear, at all times, the tops of the trays 2. It follows that said stops contact with some of the cans and co-acting with said conveyer and with said alining members tend to crowd the cans contacted, and thus more or less the entire group, into the aforesaid positions in which their centers will register with the said centers and axes of said operating devices. After the stops have, as aforesaid, contacted with some of the cans, thereby checking the onward feed, or progression, of these through the runway, the aforesaid rear member $2^a$ of carrier 2, disposed to contact with some of the cans, comes into play, and by so contacting therewith and coacting with said conveyer, with said lateral alining members, and, in turn, with each of said stops, ultimately forces said group of cans into the aforesaid required positions in which the center of each can is in exact register with the center of a finally operating part of one of said operating devices, whereupon said rear member, so co-acting, combines to hold said group in said positions until the particular stop then in coaction therewith is raised out of the said normal position in the path of the cans in said runway.

It follows that however irregularly the cans may be placed, or afterward disturbed, in the carriers, or on the conveyer, their progression through the machine operates to bring them in turn automatically, and inevitably, into required register with each successive group of operating, including my solder-placing, devices, the cans being constantly guided laterally toward required positions by the lateral alining devices M, intermittently crowded toward said positions by said stops, and ultimately forced thereinto, and held there, relatively to each plurality of operating devices, in turn, by said rear members $2^d$ of the carriers 2. On the other hand it will be observed that no group of cans can at any time pass beyond its required position beneath any of said pluralities of operating devices until released through said raising of a stop; also that one or more groups of cans may be simultaneously advanced in the runway while one or more groups are simultaneously manipulated by one or more of said pluralities of operating devices, this being possible because of the continuous motion of the endless conveyer chains 3 on which the said carriers loosely ride, the chains constantly propelling each carrier until its cans are clamped stationary between one of said stops and said carrier's said rear member $2^d$, after which, and until said stop is lifted to open the path of the cans in the runway as hereinafter described, said chains will slip onward under the bottom of said carrier, the while, by their friction with latter, constantly imparting to said rear member $2^d$ sufficient pressure against the therewith contacting cans to hold, through co-action of said alining members and said stop, the entire group of cans in required register with the then superimposed group of operating devices during manipulation by latter and until said stop is lifted.

Any convenient means may be employed to so raise said stops as to open the runway for passage of the cans. For example the stop 11 adjacent my hereinafter described solder-placing devices is, as diagrammatically indicated in Fig. 1, raised by depressing the free end of a lever $11^a$ whose opposite end is pivoted on a bracket carried by the base on which the machine rests, the said lever $11^a$ being connected by a link $11^b$ with a lever $11^c$ connected by a link $11^d$ with said stop, and said lever $11^c$ being pivoted on a bracket depending from the frame member E of the machine.

Referring now particularly to my novel solder-placing devices, their function is to deposit one of the aforesaid rings of cold solder simultaneously upon each can of the group treated, and to so deposit or place said ring that it shall overlie the said circular open seam between the can and the cap thereon previously placed by the preceding group A of operating devices. A ring 13, such as referred to is shown in perspective in Fig. 10, and its desired final position relatively to cap and can in Figs. 8 and 11. My said solder-placing devices include a vertically movable frame N comprising an upper plate 14 and a lower plate 15. The lower plate carries a plurality of like cylindrical magazines 16, adapted to contain and control, in independently movable relation thereto, each of a plurality of the aforesaid solder rings. See for example Fig. 9. The number of such magazines is equal to the number of cans to be simultaneously treated,—in this instance sixteen. The plates 14 and 15 are, as shown in Fig. 4, secured to posts 17, secured in turn to bars 18, carried by brackets 19, secured to vertically movable rods 20, slidably supported within the above referred to stationary parts of the machine, towit, the members E, E', F, G, and also passing slidably through the horizontal bars 21 (Fig. 4) carried by posts 21ª, 21ᵇ, carried by said member E (Fig. 3). The rods 20 are provided with rack-teeth 22 with which mesh gears 23 carried by a shaft 24 rotatably supported in brackets 25 carried by stationary elements E, E', of the machine (Figs. 3 and 4). The shaft 24 is rotated manually by means of a thereby carried handle 26.

Figures 6, 7, 9, 10:
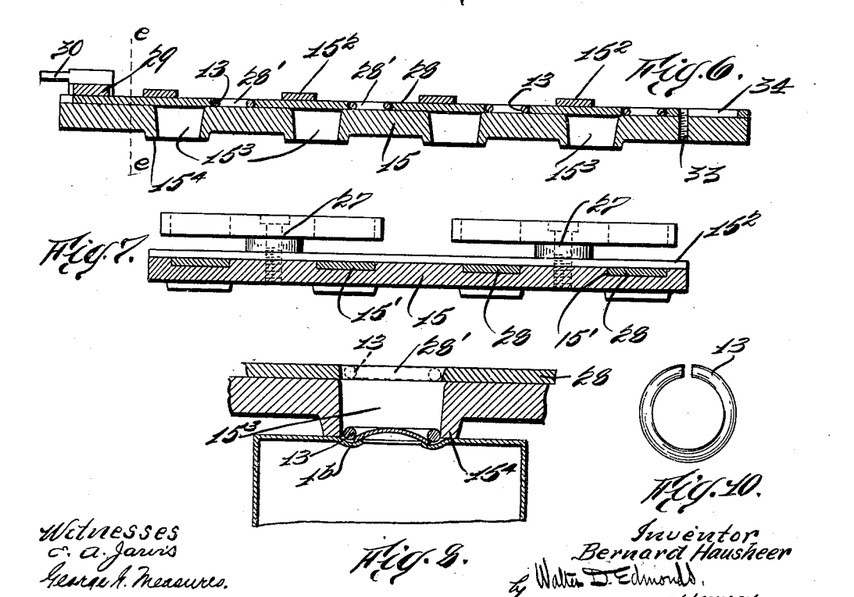
Fig. 6 is a detail cross-sectional view, on enlarged scale, taken on the line *d—d* of Fig. 5, viewed in the direction of the arrow intersecting said line, the same showing more fully my slide-plate.
Fig. 7 is a longitudinal sectional view of Fig. 6, taken on the dotted line *e—e* of said figure, and showing particularly the brackets for holding the lower magazines.
Fig. 9 is a vertical cross-sectional view of details comprising my ring magazines, upper ring-receiving tubes and their supports, my slide-plate, etc.
Fig. 10 is a perspective view, on enlarged scale, of one of the solder rings.
Figure 12:
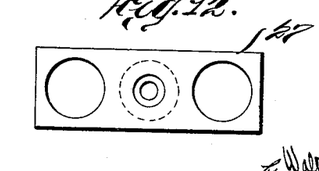
Fig. 12 is a plan view of details to show more clearly the means whereby the ring-magazines are supported.

The tubular magazines 16 are, as shown in Fig. 9, detached tubular blocks loosely mounted in, and controlled against lateral movements by, supporting members 27 carried by the plate 15 (see also Figs. 7 and 12). The diameter of the internal bore, 16', of said blocks is a little greater than the external diameter of the rings 13 to insure easy passage of the latter therethrough by gravity.

Figure 5:
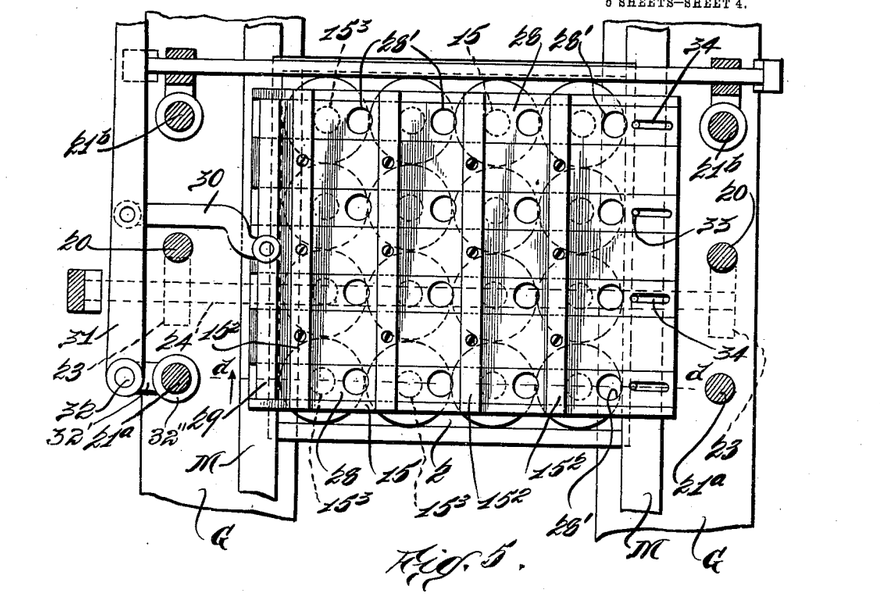
Fig. 5 is a plan of Fig. 4, partly in section, said section being taken on the line *c—c* of Fig. 4.

The magazines bear vertically upon, and are thus supported by, horizontally disposed, and movable, slides 28, there being in this instance four of the latter, i. e. one for each transverse row of cans (see Fig. 5). The slides are movably supported by the plate 15 in therein countersunk guideways 15' (Fig. 7) and are slidably retained in the latter by thereby carried cross-bars 15² (Figs. 5 and 6). The thickness of the slides approximates as nearly as possible the average diameter of the solder wire composing the rings.

Each slide is perforated by a passage 28', four of the latter being provided in the present case, i. e. one passage for each can in each transverse row. The diameters or apertures of said passages correspond with those of the bores of the magazines. The construction is such that the centers of said passages register with the centers of the bores of the magazines when the slides are in normal position, and the vertical axes of said centers are spaced-apart a distance equal to the diameter of the cans. It will be observed, by reference to Fig. 4, that the said axes are offset from the vertical central axes of the cans when the latter have been brought into required positions by co-action of the stop 11, lateral guide-members M, rear member 2ᵈ of the tray, and chains 3, as hereinbefore described.

The plate 15 is perforated by circular passages 15³, in this instance sixteen in number, i. e. one for each can. The plate is preferably provided with annular, depending, lugs 15⁴ which serve to project said passages below the plate. The interior of these passages is slightly conical, their uppermost diameter being greater than their lower diameter, which last is but slightly greater than that of said rings. The central vertical axes of said passages are spaced-apart a distance equal to the diameter of the cans, and the construction is such that when the cans have been brought into and are held in required stationary position by my forwarding, centering, and holding devices as aforesaid, the said axes register with the central vertical axes of the cans, of the caps, and of the circular joints between them (see Figs. 3, 4 and 5).

Means are provided whereby the operator can move the slides simultaneously from their aforesaid normal positions in which their passages, or openings, register with the bores of the magazines, to positions in which said passages register with those of the plate 15. The slides 28 are connected together at one end thereof by a tie-bar 29 (Fig. 5) connected by a link 30 to a hand-lever 31 vibratably supported on a pivot 32 carried by a stud 32' carried by a collar 32'' slidably mounted on a stationary part of the machine, in this instance the post 21ª (Fig. 3). The horizontal oscillations of the slides are limited by the stop-pins 33 carried by the plate 15 contacting with the ends of the slots 34 in the slides (Figs. 5 and 6.)

I provide means to facilitate and regulate the charging of the solder rings into the magazines 16 whether the machine be then, or not, in operation. Referring to Fig. 9, the upper plate 14 is provided with circular openings 14ª registering concentrically with the bores of the magazines 16. Cylinders 35 of internal diameter substantially equal to that of said magazines are, in alinement with the latter, vertically adjustably supported in said openings 14ª in any convenient way, as, for example, as shown in Fig. 9 by insertion in annular split-flanges 36 carried by the plate 14 over which flanges are sleeves 36 through which are threaded set screws 37 by turning which pressure is exerted on said flanges sufficient to cause them to bind the cylinders 35 firmly in desired position. A guide-rod 40 of preferably circular cross-section, and of less diameter than the interior of said rings is disposed to extend within, but without contacting, each magazine 16 and the thereto corresponding cylinder 35. The guide-rods are movably retained in their said positions by pins 41, 42, which are passable respectively into opposite, and mutually registering, radially disposed, perforations 43, 44, and 45, 46, in the sides of the cylinders 35. The rods 40 are provided with radially disposed perforations 47, 47ª, capable of registering, in alinement, with the perforations 43, 44, 45, 46, when the rods are suitably positioned. By these means the guide-rods 40 may be loosely and removably suspended in the cylinders 35 and in the magazines 16 by either the pin 41, as shown in Fig. 9, or by the pin 42, as shown by dotted lines. It will be noted that when suspended by the pins, or either of them, the rods are barely, but quite, cleared by the slides.

The solder-rings are charged into the magazines as follows: The pins 41, 42, are withdrawn, thus permitting the guide-rods 40 to rest by gravity upon the plate 15. The upwardly-projecting, free, ends of the rods are then inserted into the rings by hand and the rings permitted to slide down the rods by gravity through the cylinders 35, and into the magazines 16 to the extent of the latter's capacity, and in position as shown in Fig. 9. The rings are thus threaded or loaded upon the rods until the level of the thus piled rings rises to the position of the upper pin 41. The rods are then manipulated and raised so as to admit insertion therethrough of the upper pin 41 as shown in Fig. 9. Should this supply of rings prove insufficient, and it be desired to add thereto during operation of the machine, this may be accomplished, owing to my aforesaid construction, by inserting the lower pins 42 through the rods as shown by the dotted lines in Fig. 9. The upper pins 41 being then withdrawn, additional rings are inserted as before until their level rises to that of the perforations 43, 44, whereupon the pins 41 are returned to their normal position. The pins 42 being then withdrawn, the rings so added will, by gravity, drop finally into the magazines, and thus add to latter's supply, without stopping the operation of the machine. By repeating these operations indefinitely the machine may be operated continuously without pausing to charge the magazines.

The operation of the machine in its entirety is as follows:—The cans are placed by hand in the carriers, or trays, and the latter deposed on the endless conveyer-chains 3 near the receiving end of the machine. Thence the trays are, by the chains, advanced until arrested by contact of the stop 10 with some of the cans, at which time the latter will have been automatically centered relatively to the cap-placing devices, group A, as previously described. The cap-placing devices having performed their functions, i. e. placed a cap over each can-opening, in the proper positoin as shown in Figs. 8 and 11, the stop 10 is raised by the operator, thus permitting the conveyer-chains to forward the trays and their contained cans until again arrested by contact of the latter with the stop 11, by which time the cans will, as before, be centered, this time in alinement with the centers of the passages 15³ in the plate 15, and there held until the stop 11 is raised. While the cans are so held the operator, by depressing the handle 26, lowers the plate 15 and its therewith connected elements until the annular lugs 15⁴ rest upon the cans. The operator then actuates the lever 31 whereby the slides 28 are simultaneously moved from normal position, in which their passages 28' register with the centers of the magazines, to the position shown in Fig. 8 in which said passages register with the passages 15³ in the plate 15. It follows that thereby a ring is carried from beneath each magazine to position, shown in dotted lines in Fig. 8, from which it falls by gravity, in the direction indicated by the arrow, through passage 15³ in plate 15 and onto the cap and can, in exactly its required final position as shown in full lines in Fig. 8. The rings are thus accurately placed upon all of the sixteen cans simultaneously by a single operation. This done, the operator actuates the handle 26 to raise the plate 15 and its therewith combined elements to normal position, thus releasing therefrom the cans, raises the stop 11 sufficiently to enable the tray and its contained cans to proceed to the next stop 12, drops the stop 11 to await the next tray of cans, and by manipulating the lever 31 in reverse direction restores the slides to normal position which are then immediately charged by gravity with another set of rings ready for the next tray of cans.

It goes without saying that a suitable flux must be added to the solder rings. This is done in any convenient manner whether by hand, or by a group of such simultaneously flux-applying automatic devices as are indicated in Figs. 1 and 2 of my aforesaid Letters Patent No. 1,030,300, to patent which I have now pending divisional application, Serial Number 697,138, filed May 14, 1912, or by treating the solder rings to a suitable liquid flux preliminarily to charging them into the magazines of my present machine. Such particular fluxing means I refrain from describing herein, as being unnecessary to understanding of my herein-claimed invention, and it being obvious that the indispensable flux may be supplied in a variety of well known ways.

As particularly conducive to the successful operation of my machine should be noted its following characteristics, viz:—

(a.) The magazines 16 are loosely held, i. e. are capable of laterally and vertically moving, at all times, sufficiently to accommodate the ordinary, substantially-unavoidable, moderate departures from standard in shape and thickness of the rings, as, for example, if a ring resting on the plate 15 projects, in whole or in part, upwardly more than the thickness of the slide. In such cases the ring when impelled horizontally by the slide merely lifts, or sometimes also slightly rocks, the magazine sufficiently to permit the ring to pass from thereunder, and this without any prohibitory disturbance of the positions, and subsequent behavior, of the then superimposed rings. To this end it will be also noted that both the upper and the lower inner edges of the magazines are slightly beveled as shown in Fig. 9, and more clearly at 16² and 16³ in Fig. 13. The support of the magazines, by gravity only, upon the slides insures at all times the requisite close contact between these two elements of the machine. On the other hand the magazines are free to rise to the extent, and whenever, required to avoid jamming.

(b.) The guide rods 40 are free to move to a more or less limited extent at all times and in all directions, the passages 47, 47ᵃ, therethrough being, as indicated in Fig. 9, of somewhat greater diameter than that of the pins 41, 42. The rods are thus relatively to the cylinders 35 and magazines 16 floating members adapted for limited universal motion therein, whereby the aforesaid dissimilarities in shape and thickness of rings are accommodated without risk of jamming, or stopping the gravity feed of the rings, either during operation of the machine or when inserting the rings thereinto.

(c.) The passages in the plate 15 are downwardly tapering as shown in Fig. 9. This makes allowance for any lost motion in the slides insuring the delivery of the rings from the latter into the passages and their guidance or delivery to exactly the positions required.

After the solder rings have been placed in position as above described, the tray proceeds to the final group C of soldering devices, i. e. the soldering irons where the rings are melted and ironed, together with the flux, as required to make hermetic seals, the said devices being preferably such as are disclosed in my said pending application, Serial No. 702,154 filed June 7, 1912.

It will be understood that my invention is not confined to exactly the relative shapes, sizes, proportions or combinations of its constituent elements as hereinbefore described, and shown in the drawings, as these may be obviously varied more or less as may be preferable to suit the requirements or convenience of any particular case. Certain of my novel elements or sub-combinations thereof may likewise be usefully employed without aid of the remaining elements constituting the entire novel combination as shown in the drawings, and this without departing from my invention. Likewise my invention as so defined is not confined to the placing of solder rings specifically, or to the placing of these upon cans only, it being manifestly applicable to the manipulation, and accurate placing, of other articles upon other things.

What I claim as new and desire to secure by Letters Patent is the following, viz:—

1. In a solder-placing machine having a runway for the cans, disposed above said runway a transversely movable slide having a downwardly extending passage therethrough; disposed above and vertically-movable independently of said slide a magazine having a downwardly-delivering outlet normally registering with said passage; disposed beneath, and transversely-immovable relatively to said slide, a plate having a downwardly-delivering passage therethrough registrable with said passage in said slide; means to center a can in said runway with said passage in said plate; means to simultaneously lower said magazine, said slide, and said plate until stopped by said can; and means to move said slide transversely until its said passage registers with said passage in said plate.

2. In a solder-placing machine having a runway for the cans, disposed above said runway a plurality of transversely-movable slides each having a plurality of downwardly-extending passages therethrough; disposed above and vertically-movable independently of said slides magazines equal in number to said passages and each having a downwardly-delivering outlet normally registering with one of said passages; disposed beneath and transversely immovable relatively to said slides a plate having therethrough a plurality of downwardly delivering passages respectively registrable with one of said passages in said slides; means to center each of a plurality of cans in said runway with one of said passages in said plate; means to simultaneously lower said magazines, said slides and said plate until stopped by said cans and means to simultaneously move said slides transversely until each of their said passages registers with one of said passages in said plate.

3. In a solder-placing machine having a runway for the cans, disposed above said runway a transversely-movable slide having a downwardly-extending passage therethrough; disposed above and vertically-movable independently of said slide a cylindrical magazine having a downwardly-delivering, bevel-edged, outlet normally registering with said passage; disposed beneath and transversely-immovable relatively to said slide a plate having a downwardly-delivering passage therethrough registrable with said passage in said slide; means to center a can in said runway with said passage in said plate; means to simultaneously lower said magazine, said slide, and said plate until stopped by said can; means to move said slide transversely until its said passage registers with said passage in said plate.

4. In a solder-placing machine having a runway for the cans, disposed above said runway a plurality of transversely-movable slides each having a plurality of downwardly-extending passages therethrough; disposed above and vertically-movable independently of said slides cylindrical magazines equal in number to said passages and each having a downwardly-delivering, bevel-edged, outlet normally registering with one of said passages; disposed beneath and transversely-immovable relatively to said slides a plate having therethrough a plurality of downwardly-delivering passages respectively registrable with one of said passages in said slides; means to center each of a plurality of cans in said runway with one of said passages in said slides; means to simultaneously lower said magazines, said slides and said plate until stopped by said cans; and means to simultaneously move said slides transversely until each of their said passages registers with one of said passages in said plate.

5. In a machine of the class described a magazine having therethrough a passage terminating in a downwardly presented opening; disposed within and above said passage a rod extending normally to said opening; means disposed above said passage to suspend said rod movably in every direction; beneath said opening a slide having therethrough a passage normally in alinement with said passage; and means to move said slide transversely of said passage.

6. In a machine of the class described a horizontally movable slide having a downwardly-extending passage therethrough, disposed above said slide a magazine having a downwardly-delivering outlet registering with said passage when said slide is in normal position, disposed partly within and extending above said magazine a rod movable relatively thereto, means disposed above said magazine to suspend said rod in its said disposition, disposed beneath said slide a stationary member having a downwardly-delivering passage therethrough registrable with said passage in said slide, and means to move said slide from its said normal position until its said passage registers with said passage in said stationary member.

7. In a machine of the class described a horizontally movable slide having a downwardly-extending passage therethrough, disposed above said slide a magazine having a downwardly-delivering outlet registering with said passage when said slide is in normal position, disposed partly within and extending above said magazine a rod movable relatively thereto, means disposed above said magazine to suspend said rod in its said disposition, disposed beneath said slide a stationary member having a downwardly-delivering passage therethrough registrable with said passage in said slide, means to move said slide from its said normal position until its said passage registers with said passage in said stationary member, and means to vertically move simultaneously said slide, said magazine, said rod, and said member.

8. In a machine of the class described a loosely supported magazine having therethrough a vertically extending passage, disposed partly within and extending above said passage a rod movable relatively thereto and containing a transverse perforation, supported above said magazine a member concentric with said rod and having perforations disposed to register with said perforation thereof, and a movable pin disposed through said perforations.

9. In a can-manipulating machine having a runway for the cans the combination of the following elements, viz:—supported above said runway a vertically movable member comprising an even-numbered plurality of downwardly-delivering passages having their centers equally spaced-apart; a carrier comprising a bottom adapted to loosely carry a group of like cans each of diameter equal to the interspace between said centers; under said runway an endless conveyer on which said carrier loosely rides; means to impart to said conveyer continuous motion in parallelism with said runway; on each side of said runway parallel lateral alining members spaced and disposed to contact with some of said cans and coacting with said conveyer to guide said group toward positions in which their centers register with said centers of said passages; transverse said runway in the path of said cans a movable normally closed stop disposed to contact with some of said cans and coacting with said conveyer and said lateral members to crowd said groups toward said positions; on said carrier a rear member disposed to contact with some of said cans and, coacting with said conveyer said lateral members and said stop, to ultimately force and hold said group stationary in said positions; means to simultaneously deliver solder into each of said passages while the cans are so held; and means to raise said stop out of the path of said cans in said runway.

10. In a can-manipulating machine having a runway for the cans the combination of the following elements, viz:—supported above said runway a vertically movable member comprising a plurality of downwardly-delivering passages having their centers equally spaced-apart; means to deliver to each of said passages simultaneously a predetermined like amount of solder; a carrier comprising a bottom adapted to loosely carry a group of as many like cans as there are passages, the diameter of each said can being equal to the interspace between said centers of said passages; below said runway an endless conveyer on which said carrier loosely rides; means to impart to said conveyer continuous motion in parallelism with said runway; on each side said runway parallel lateral alining members spaced-apart a distance equal to the sum of the said diameters or an aliquot part of the number of said cans and disposed to contact with some of said cans and coacting with said conveyer to guide said group toward positions in which their centers register with said centers of said passages; transverse said runway in the path of said cans a movable normally closed stop disposed to contact with some of said cans and coacting with said conveyer and said lateral members to crowd said group toward said positions; on said carrier a rear member disposed to contact with some of said cans and coacting with said conveyer said lateral members and said stop to ultimately force and hold said group stationary in said positions; and means to raise said stop out of the path of said cans in said runway.

11. In a can-manipulating machine having a runway for the cans the combination of the following elements, viz:—supported above said runway a vertically movable plate, comprising a plurality of downwardly-delivering passages having their centers equally spaced-apart; slidably carried on and by said plate a slide having a plurality of downwardly-extending passages therethrough, their centers spaced-apart the same as said centers of said plate; riding loosely on said slide a like plurality of therefrom detached movable magazines each having a downwardy-delivering outlet normally disposed to register with one of said passages of said slide when the latter is in normal position; means independent of said slide to loosely and movably support said magazines in their said normal dispositions; means to move said slide from its said normal position until its said passages register with the passages in said plate; means to feed through said runway simultaneously as a group cans in number equal to the passages in said slide; means to adjust said cans in positions in which the center of each registers with the center of one of said passages in said plate; and means to vertically move said plate and its therewith connected elements.

12. In a machine of the class described, a magazine having therethrough a passage terminating in a downwardly presented opening; disposed within said passage a rod extending normally to said opening; means disposed above said passage to hold said rod suspended movably in a plurality of directions; beneath said opening a slide having therethrough a passage normally in alinement with said passage in said magazine; beneath said slide a plate having therethrough a downwardly-delivering passage registrable with said passage in said slide; and means to move said slide from its said normal position until its passage registers with said passage in said plate.

BERNARD HAUSHEER.

Witnesses:
 RUTH C. GUSTAFSON,
 L. E. ELDRIDGE.

---

Copies of this patent may be obtained for five cents each, by addressing the "Commissioner of Patents, Washington, D. C."

It is hereby certified that in Letters Patent No. 1,104,261, granted July 21, 1914, upon the application of Bernard Hausheer, of Norwich, New York, for an improvement in "Solder-Placing Machines," errors appear in the printed specification requiring correction as follows: Page 7, line 12, for the word "slides" read *plate;* page 8, line 5, for the word "or" read *of;* and that the said Letters Patent should be read with these corrections therein that the same may conform to the record of the case in the Patent Office.

Signed and sealed this 1st day of September, A. D., 1914.

[SEAL.]
R. F. WHITEHEAD,
*Acting Commissioner of Patents.*